(12) United States Patent
Lee et al.

(10) Patent No.: US 8,738,254 B2
(45) Date of Patent: May 27, 2014

(54) NON-SYNCHRONOUS AUTOMATIC TRANSMISSION UP-SHIFT CONTROL UTILZING INPUT TORQUE SIGNAL

(75) Inventors: Seung Hoon Lee, Northville, MI (US); Yuji Fujii, Ann Arbor, MI (US); Bradley Dean Riedle, Northville, MI (US); Gregory Michael Pietron, Canton, MI (US); Diana Yanakiev, Birmingham, MI (US); Joseph F. Kucharski, Livonia, MI (US); Hongtei Eric Tseng, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 747 days.

(21) Appl. No.: 12/950,044

(22) Filed: Nov. 19, 2010

(65) Prior Publication Data

US 2012/0130610 A1    May 24, 2012

(51) Int. Cl.
  *G06F 7/00*    (2006.01)
  *G06F 17/00*    (2006.01)
  *G06F 19/00*    (2011.01)

(52) U.S. Cl.
  USPC .......................................................... 701/58

(58) Field of Classification Search
  CPC ............................... F16H 2342/044
  USPC ........................ 701/51, 54–56, 58
  See application file for complete search history.

(56) References Cited

U.S. PATENT DOCUMENTS

| | | | |
|---|---|---|---|
| 4,724,723 A * | 2/1988 | Lockhart et al. | 477/102 |
| 5,319,555 A | 6/1994 | Iwaki et al. | |
| 6,243,637 B1 * | 6/2001 | Minowa et al. | 701/51 |
| 6,830,531 B1 | 12/2004 | Koenig et al. | |
| 6,991,584 B2 | 1/2006 | Cowan | |
| 7,762,925 B2 | 7/2010 | Dickinson | |
| 2006/0162475 A1 | 7/2006 | Eriksson et al. | |
| 2008/0139362 A1 * | 6/2008 | Fujii et al. | 477/109 |
| 2009/0013803 A1 * | 1/2009 | Lohr et al. | 73/862.338 |
| 2010/0262344 A1 * | 10/2010 | Fujii et al. | 701/55 |
| 2010/0318269 A1 * | 12/2010 | Yanakiev et al. | 701/55 |
| 2011/0184613 A1 * | 7/2011 | Fujii et al. | 701/54 |
| 2011/0264342 A1 * | 10/2011 | Baur et al. | 701/54 |

* cited by examiner

*Primary Examiner* — Khoi Tran
*Assistant Examiner* — Harry Oh
(74) *Attorney, Agent, or Firm* — James Dottavio; Brooks Kushman P.C.

(57) ABSTRACT

A non-synchronous automatic transmission up-shift control utilizes input torque measurements. The input torque is measured during an up-shift having preparatory, torque, and inertia phases. Target input torque profiles for the torque and inertia phases are determined based on the input torque during the preparatory phase. During the torque phase, an engine torque is controlled to cause the input torque to achieve the target profile for the torque phase. During the inertia phase, the on-coming clutch is controlled to cause the input torque to achieve the target profile for the inertia phase.

20 Claims, 6 Drawing Sheets

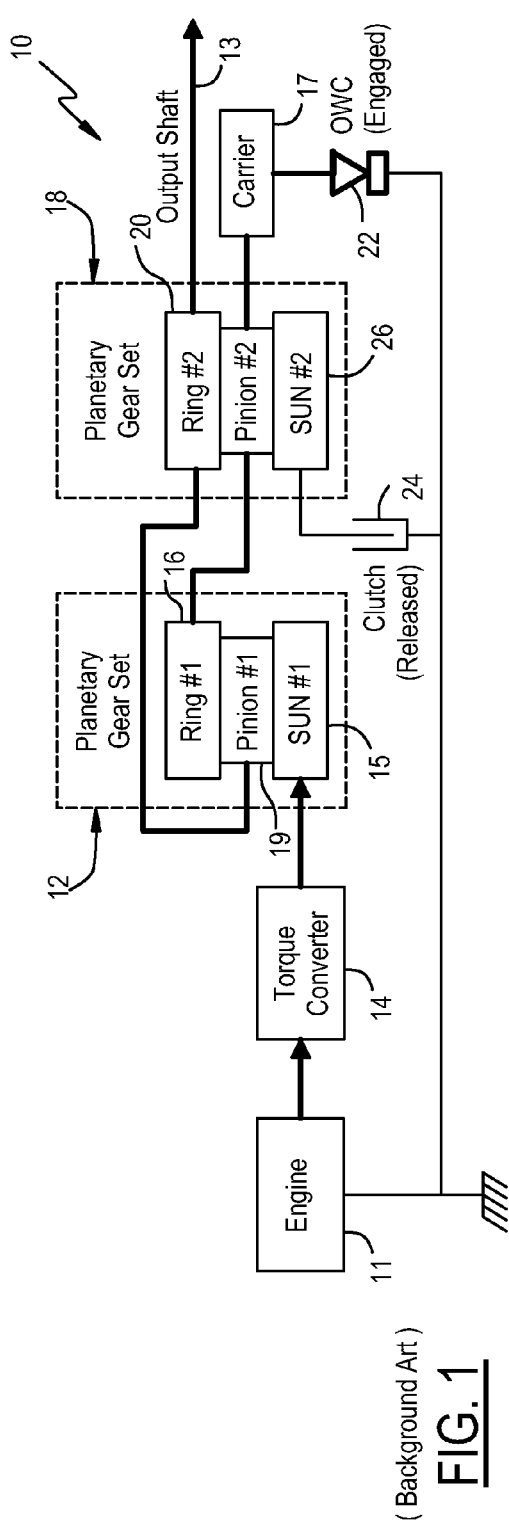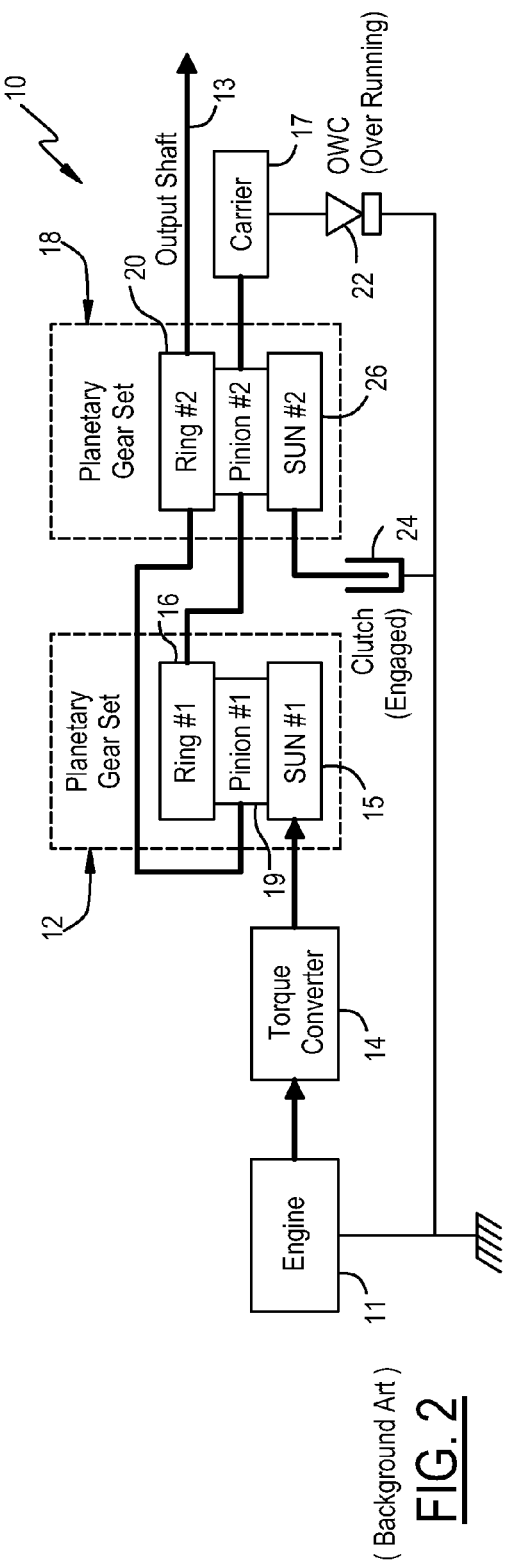
(Background Art) FIG. 1
(Background Art) FIG. 2

NON-SYNCHRONOUS AUTOMATIC TRANSMISSION UP-SHIFT CONTROL UTILZING INPUT TORQUE SIGNAL

BACKGROUND

1. Technical Field

The present invention relates to multiple ratio geared transmissions for use in an automotive vehicle powertrain and to a control strategy for effecting engagement and release of transmission friction torque establishing elements during a ratio change.

2. Background Art

A multiple-ratio (i.e., step-ratio) automatic transmission in an automotive vehicle powertrain adjusts a gear ratio between a torque source and a driveshaft to meet drive-ability requirements under dynamically-changing driving conditions. Ratio changes are achieved by engaging a so-called on-coming clutch ("OCC") as a so-called off-going clutch is released. The clutches, which may be referred to as transmission friction elements or brakes, establish and disestablish power flow paths from an internal combustion engine to vehicle traction wheels. During acceleration of the vehicle, the overall speed ratio, which is the ratio of transmission input shaft speed to transmission output shaft speed, is reduced as vehicle speed increases for a given engine throttle setting. This is an up-shift.

In the case of a non-synchronous automatic transmission, the up-shift event involves engagement control of only the OCC, while a companion clutch, typically a one-way coupling ("OWC"), automatically disengages to reduce both speed ratio and torque ratio. During the non-synchronous up-shift, the OCC becomes automatically unlocked and over-run to lower both the gear ratio (i.e., the overall speed ratio) and the torque ratio (the ratio of output torque to input torque).

The non-synchronous up-shift can be divided into three phases, which may be referred to as a preparatory phase, a torque phase, and an inertia phase. The torque phase is a time period when the OCC torque is purposely raised for its engagement until the OWC starts slipping or overrunning. The non-synchronous up-shift does not involve active control of the OWC. Torque transmitted through the OWC automatically decreases in response to increasing OCC torque. As a result of this interaction, the transmission output shaft torque drops creating the so-called "torque hole." A large torque hole can be perceived by a vehicle occupant as an unpleasant shift shock. The preparatory phase is a time period prior to the torque phase. The inertia phase is a time period when the OWC starts to slip, following the torque phase.

A conventional non-synchronous control during the torque phase relies on an open-loop approach for OCC engagement. Such an open-loop approach requires manual adjustment of OCC control parameters under multiple operating conditions, resulting in a large amount of effort to calibrate shift quality. It is also difficult to account for variations in actuator characteristics and dynamically changing operating conditions, resulting in inconsistent shift quality.

Other control techniques employ a coupled engine-transmission control during the torque phase to reduce or eliminate torque holes. However, in practice, it is difficult to coordinate engine torque and clutch engagement due to their finite controllability with the presence of various noise factors. In order to improve the control robustness, some control algorithms aim at reducing errors between target clutch torques as compared with those derived from torque sensor measurements within a transmission system. However, engine and transmission controls still remain tightly coupled through kinematic constraints. Synchronization or coupling between engine torque control and OCC engagement control is still required.

In view of the foregoing, there is a need to reduce the complexity of an up-shift control for improved shift consistency and control robustness.

SUMMARY

In at least one embodiment, a method for a non-synchronous automatic transmission is provided. The transmission has gearing defining multiple torque flow paths from an input shaft to an output shaft and further having a one-way coupling ("OWC") and an on-coming clutch ("OCC") for shifting from a low gear configuration to a high gear configuration during a ratio up-shift event having a preparatory phase, a torque phase, and an inertia phase. The method includes during the up-shift event, measuring input torque using an input torque sensor in communication with the input shaft. The method includes determining a target input torque profile for the torque phase and a target input torque profile for the inertia phase each based on the input torque measured during the preparatory phase. The method includes, during the torque phase, raising the torque capacity of the OCC and controlling an engine torque to cause the input torque to achieve the target input torque profile for the torque phase. The method includes, during the inertia phase, controlling the OCC to cause the input torque to achieve the target input torque profile for the inertia phase.

In at least one embodiment, a non-synchronous automatic transmission is provided. The transmission includes an input shaft connectable to an engine via a torque converter; an output shaft; and gearing defining multiple torque flow paths from the input shaft to the output shaft. The transmission further includes a OWC and an OCC for shifting from a low gear configuration to a high gear configuration during a ratio up-shift event having a preparatory phase, a torque phase, and an inertia phase. The transmission further includes an input torque sensor in communication with the input shaft and configured to measure input torque during the up-shift event. The transmission further includes a controller in communication with the OCC, the engine, and the input torque sensor. The controller is configured to determine a target input torque profile for the torque phase and a target input torque profile for the inertia phase each based on the input torque measured during the preparatory phase. The controller is further configured to, during the torque phase, raise the torque capacity of the OCC and control an engine torque to cause the input torque to achieve the target input torque profile for the torque phase. The controller is further configured to, during the inertia phase, control the OCC to cause the input torque to achieve the target input torque profile for the inertia phase.

In at least one embodiment, another method is provided. This method includes measuring input torque of a non-synchronous transmission having a OWC and an OCC during an up-shift having preparatory, torque, and inertia phases. This method includes determining a target input torque profile for the torque phase based on the input torque during the preparatory phase. This method further includes, during the torque phase, raising the torque capacity of the OCC and controlling an engine torque to cause the input torque to achieve the target profile for the torque phase.

This method may further include determining a target input torque profile for the inertia phase based on the input torque during the preparatory phase and, during the inertia phase, controlling the OCC to cause the input torque to achieve the target profile for the inertia phase.

BRIEF DESCRIPTION OF THE DRAWINGS

FIG. 1 illustrates a schematic representation of a conventional multiple-ratio non-synchronous automatic transmission in a low gear configuration;

FIG. 2 illustrates a schematic representation of the conventional transmission in a high gear configuration;

DETAILED DESCRIPTION

Figure 3:
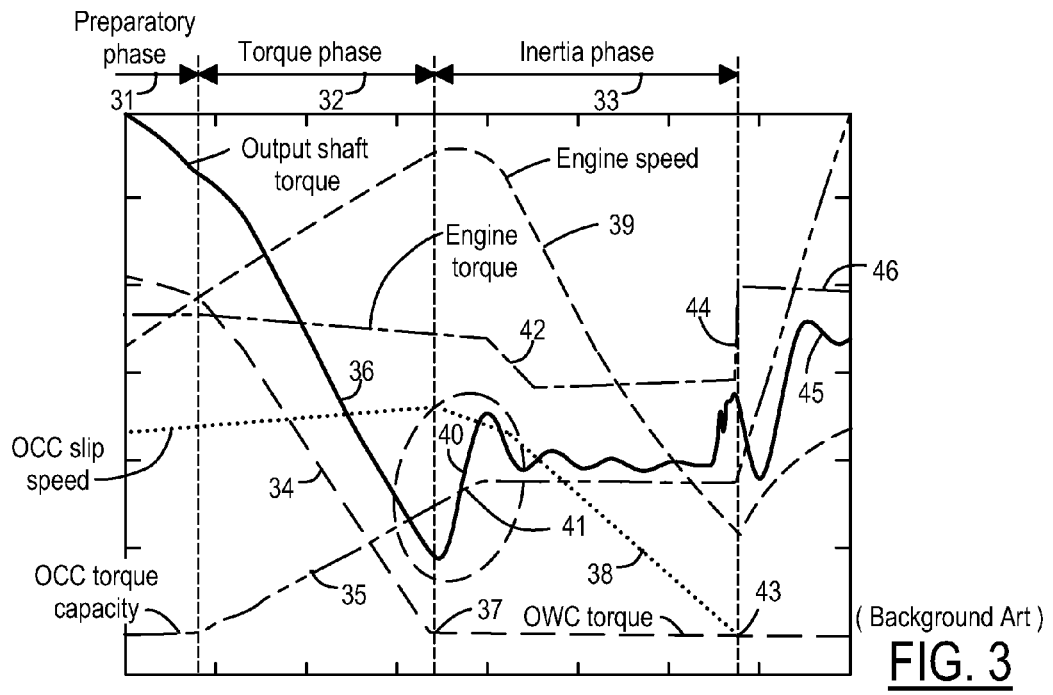
FIG. 3 illustrates a plot of a non-synchronous up-shift event with a constant engine throttle setting according to a conventional up-shift control method for the conventional transmission.

Detailed embodiments of the present invention are disclosed herein; however, it is to be understood that the disclosed embodiments are merely exemplary of the present invention that may be embodied in various and alternative forms. The figures are not necessarily to scale, some features may be exaggerated or minimized to show details of particular components. In addition, any or all features from one embodiment may be combined with any other embodiment. Therefore, specific structural and functional details disclosed herein are not to be interpreted as limiting, but merely as a representative basis for the claims and/or as a representative basis for teaching one skilled in the art to variously employ the present invention.

As indicated, the shifting of a multiple-ratio (i.e., step-ratio) automatic transmission is accompanied by applying and/or releasing friction elements (such as plate clutches, band-brakes, etc.) which change speed and torque relationships by altering planetary gear configurations. The friction elements may be actuated hydraulically, mechanically, or through other means. A realizable combination of planetary gear configurations determines a total number of ratio steps. Although various planetary gear configurations are used in automatic transmissions, the basic principle of shift kinematics is similar.

During a typical up-shift event from a lower gear configuration to a higher gear configuration, both the gear ratio (the transmission input shaft speed/transmission output shaft speed) and the torque ratio (the transmission output shaft torque/transmission input shaft torque) become lower. During the up-shift, either the off-going clutch (in a synchronous up-shift) or the one-way clutch ("OWC") (in a non-synchronous up-shift), which are each associated with the lower gear configuration, disengages while a different friction element (i.e., the on-coming clutch ("OCC")) that is associated with a higher gear configuration engages.

An embodiment of the present invention provides a closed-loop control method which eliminates or reduces torque holes while de-coupling engine control from transmission control based on measured or estimated transmission input torque signals. The control method is intended to reduce the complexity of up-shift control for improved shift consistency and control robustness. The control method is further intended to deliver a consistent and improved shift quality while reducing shift calibration requirements.

Referring now to FIGS. 1 and 2, schematic representations of a conventional multiple-gear (i.e., step-gear) non-synchronous automatic transmission 10 in an automotive powertrain are shown. As explained in greater detail below, transmission 10 has a low gear configuration in FIG. 1 and a high gear configuration in FIG. 2.

Although the powertrain shown in FIGS. 1 and 2 includes a torque converter 14 at the torque input side of transmission 10, the present invention can be used as well in a hybrid powertrain that includes, for example, an engine and an electric motor without a torque converter. In a hybrid configuration, the power of the engine is complemented by the power generated electrically by the motor. Further, the specific gearing arrangement illustrated in FIGS. 1 and 2 can be replaced by other gearing arrangements that establish multiple torque flow paths from a power source (e.g., engine 11) to an output shaft 13.

The powertrain shown in FIGS. 1 and 2 includes an internal combustion engine 11. Torque is delivered from engine 11 to a hydrokinetic torque converter 14. Turbine torque from torque converter 14 is delivered to sun gear 15 of a first planetary gear set 12. Ring gear 16 of first planetary gear set 12 is driveably connected to carrier 17 of a second planetary gear set 18. Pinion carrier 19 of first gear set 12 is driveably connected to ring gear 20 of second gear set 18. Ring gear 20 is driveably connected to output shaft 13. Carrier 17 is braked in the configuration of FIG. 1 to a stationary element of the transmission by a one-way coupling ("OWC") or overrunning coupling 22. To up-shift from a lower gear configuration to a higher gear configuration, an on-coming clutch ("OCC") 24 engages. This connects sun gear 26 of second gear set 18 to a stationary element of the transmission so that sun gear 26 acts as a reaction element. Carrier 17 no longer acts as a reaction element as OWC 22 is overrunning.

The various components of the gear sets can be connected to each other in various ways or held from turning depending on the state of clutches 22, 24 (as well as other clutches which are not shown in FIGS. 1 and 2). The ratio is obtained by the interconnection of the planetary gear sets and in which components of the planetary gear sets are held from turning. During a shift event, one or more of the clutches are in the process of being engaged or disengaged and the speed ratio of the input shaft to output shaft 13 usually varies between the two steady state ratio values that exist before and after the shift event.

As indicated, conventional transmission 10 has a low gear configuration in FIG. 1 and a high gear configuration in FIG.

2. In the low gear configuration, OCC 24 is released and OWC 22 is engaged (i.e., in a locked position). By being engaged, OWC 22 effectively grounds carrier 17 of planetary gear set 18. The speed ratio of the input shaft to output shaft 13 is higher in the low gear configuration than in the high gear configuration. The torque flow path from the input shaft through the various gear sets to output shaft 13 is indicated in FIG. 1 by heavy directional lines.

In order to change from the low gear configuration (shown in FIG. 1) to the high gear configuration (shown in FIG. 2), OCC 24 is engaged to ground sun gear 26 of second planetary gear set 18. This has the effect of changing the torque path through the components of planetary gear sets 12, 18. Each component experiences a different level of torque causing the various components to accelerate or decelerate. OWC 22 begins to overrun once the ratio change starts. Ultimately, after OCC 24 is fully engaged, the speed ratio of the input shaft to output shaft 13 becomes lower than in the low gear configuration. Notice that this shift needs to manage only one clutch (e.g., OCC 24) as the shift is a non-synchronous shift. As such, there is no synchronization between OCC 24 and another clutch such as an off-going clutch. In contrast, a synchronous shift would require synchronization between OCC 24 and the off-going clutch.

In sum, in conventional non-synchronous transmission 10, OWC 22, which is associated with a low gear configuration, automatically loses its torque and disengages during an upshift, while OCC 24, which is associated with a high gear configuration, develops engagement torque.

Referring now to FIG. 3, with continual reference to FIGS. 1 and 2, a plot of a non-synchronous up-shift event from the low gear configuration to the high gear configuration with a constant engine throttle setting according to a conventional up-shift control method for conventional transmission 10 is shown. The variables plotted in FIG. 3 are characteristic of a conventional synchronous up-shift control method. Vehicle speed can be considered to approximately constant during the shift due to its short duration.

The non-synchronous up-shift event is divided into three phases: preparatory phase 31, torque phase 32, and inertia phase 33. During preparatory phase 31, stroking of OCC 24 takes place (i.e., a hydraulic actuator of OCC is stroked), without assuming a significant torque capacity, to prepare the OCC its engagement. During torque phase 32, torque transmitted through OWC 22, or simply referred to as OWC torque, is reduced toward zero, as shown at 34, while OCC torque capacity is raised, as indicated at 35. Although the planetary gear set in the low gear configuration is still maintained as this point, the increasing torque capacity of OCC 24, as indicated at 35, reduces net torque flow within the gear set. As a result, the output shaft torque drops significantly during torque phase 32, as indicated at 36, creating the so-called torque hole. As indicated, a large torque hole can be perceived by a vehicle occupant as an unpleasant shift shock.

Torque phase 32 ends and inertia phase 33 begins when OWC torque becomes zero or a non-significant level, as shown at 37, and OWC 22 starts overrunning. During inertia phase 33, OCC slip speed decreases toward zero or a non-significant level, as indicated at 38, as it is engaged.

The engine speed drops, as indicated at 39, as the planetary gear configuration changes. During inertia phase 33, the output shaft torque, as indicated at 40, is primarily affected by OCC torque capacity, as indicated at 41. This causes the output torque to rapidly move to level 40, which corresponds to OCC torque, indicated at 41, at the beginning of inertia phase 33. Under certain conditions, this may lead to a large torque oscillation at output shaft 13 that can be perceptible to a vehicle occupant as an unpleasant shift shock.

FIG. 3 shows a reduced engine torque as indicated at 42 during inertia phase 33. This is caused by engine torque modulation by engine spark timing retard, which is a common method for reducing engine torque during inertia phase 33 of shifting to enable OCC 24 to engage within a target time without requiring excessive torque capacity. When OCC 24 completes engagement or when its slip speed becomes zero as indicated at 43, inertia phase 33 ends. The engine torque modulation is removed, as indicated at 44, and the output shaft torque returns to the level 45, which corresponds to a given engine torque level 46 (more precisely, a transmission input torque level). Note that the engine torque is raised to level 46 which is higher than its level during preparatory phase 31. This may be enabled by throttle control, spark control, or any other means, including an auxiliary torque augmenting device, to achieve the similar torque level at output shaft 13 before and after the shift event.

Figure 4:
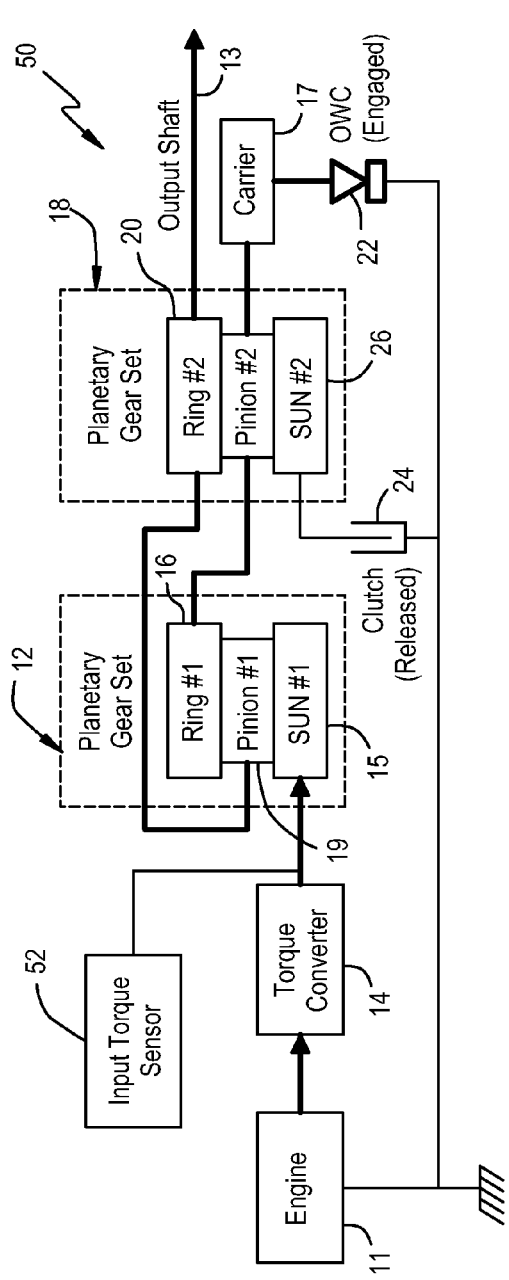
FIG. 4 illustrates a schematic representation of a multiple-ratio non-synchronous automatic transmission in accordance with an embodiment of the present invention in a low gear configuration.
Figure 5:
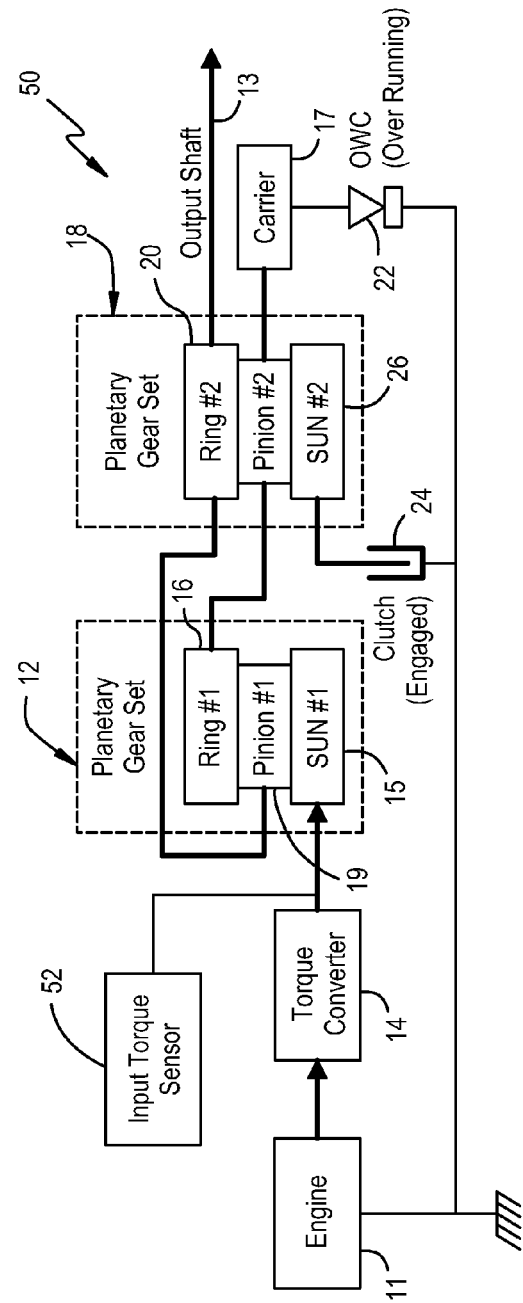
FIG. 5 illustrates a schematic representation of the automatic transmission shown in FIG. 5 in a high gear configuration.

Referring now to FIGS. 4 and 5, schematic representations of a multiple-gear non-synchronous automatic transmission 50 in accordance with an embodiment of the present invention are shown. As explained in greater detail below, transmission 50 has a low gear configuration in FIG. 4 and a high gear configuration in FIG. 5.

Transmission 50 is the same as conventional transmission 10 shown in FIGS. 1 and 2 with the exception that transmission 50 further includes an input torque sensor 52 at the input shaft. Input torque sensor 52 may be a strain-gauge base system, a force-resistive elastomer sensor, a piezoelectric load cell, or a magneto-elastic torque sensor. In a preferred embodiment, input torque sensor 52 is a magneto-elastic torque sensor such as described in U.S. Pat. Nos. 6,145,387; 6,047,605; 6,553,847; and 6,490,934. Such magneto-elastic torque sensors enable accurate measurements of torque exerted onto a rotating shaft without requiring a physical contact between a magnetic flux sensing element and the shaft. It should be understood that input torque sensor 52 can be positioned differently from that in FIGS. 4 and 5, depending on a kinematic arrangement and sensor packageability for a given transmission system, in order to implement the up-shift control methods of the present invention.

Figure 6:
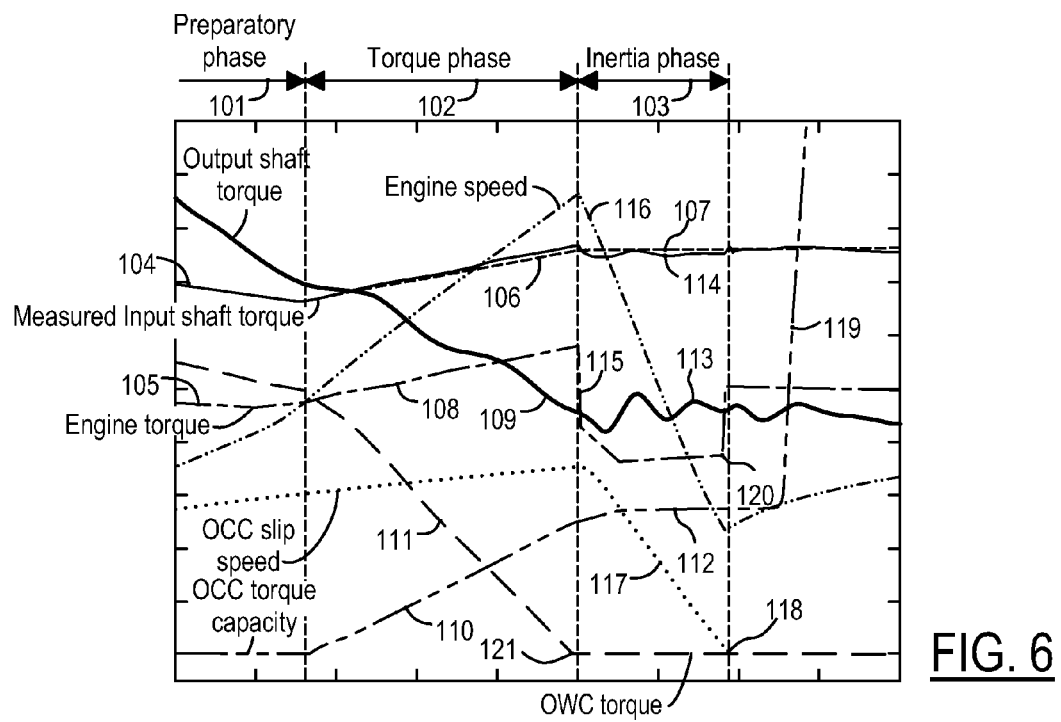
FIG. 6 illustrates a plot of a non-synchronous up-shift event according to an up-shift control method in accordance with an embodiment of the present invention for the automatic transmission shown in FIGS. 4 and 5.

Referring now to FIG. 6, with continual reference to FIGS. 4 and 5, a plot of a non-synchronous up-shift event from the low to high gear configuration according to an up-shift control method in accordance with an embodiment of the present invention for transmission 50 is shown. The plot of FIG. 6 is in regards to an up-shift control sequence provided by the up-shift control method for transitioning transmission 50 from the low to high gear configuration.

A powertrain controller (illustrated with reference to FIG. 10) carries out the steps of the up-shift control method. Throughout the up-shift event, input torque sensor 52 measures the transmission input torque at a fixed or variable sampling rate (for instance, as shown at 104). Input torque sensor 52 provides the input torque signal to the controller. In turn, the controller uses the input torque signal in carrying out the steps of the up-shift control method.

Again, the up-shift event is divided into three phases: preparatory phase 101, torque phase 102, and inertia phase 103. During preparatory phase 101, the controller initiates a command to stroke OCC 24 to prepare for its engagement. The controller increases engine torque reserve in a controlled manner without significantly raising engine torque output, as indicated at 105, and input torque, as indicated at 104. Herein, engine torque reserve is defined as the amount of accessible torque that can be readily drawn as required during torque phase 102. This may be achieved by increasing engine throttle while retarding spark timing simultaneously in a controlled manner based on the measured input torque feedback. Alternatively, other means such as electronic valve timing control and a turbo charger control may be utilized to increase engine torque reserve or transmission input torque reserve.

A control algorithm constructs a target input torque profile 106 for torque phase 102 and a target input torque profile 107 for inertia phase 103 based on the input torque measurements during preparatory phase 101. During torque phase 102, the controller increases OCC torque capacity, as indicated at 110, to engage in the high gear configuration while OWC torque is accordingly decreased. The OCC control may be performed based on an open-loop approach to achieve a prescribed torque profile. Alternatively, the OCC control may be based on a closed loop approach.

However, in accordance with embodiments of the present invention, the controller taps into engine torque reserve which is created during preparatory phase 101 and adjusts engine output torque during torque phase 102, as indicated at 108, by engine spark timing or other means to achieve target input torque profile 106, thereby eliminating or reducing a torque hole during torque phase 102, indicated with reference to 109. At the end of torque phase 102, OWC torque is dropped toward zero, as indicated at 121, and starts overrun. When OWC 22 starts overrun, torque phase 102 ends and inertia phase 103 begins.

During inertia phase 103, OCC torque capacity 112 primarily affects output shaft torque 113 and input shaft torque 114. The controller adjusts the actuator of OCC 22 to achieve target input torque profile 107 through a close loop control based on input torque measurements indicated at 114 during inertia phase 103. The controller may modulate the engine torque during inertia phase 103, as indicated at 115, according to a conventional engine control practice. During inertia phase 103, the engine speed decreases, as indicated at 116, as OCC slip speed drops, as indicated at 117. When OCC 24 is securely engaged, as indicated at 118, the up-shift event completes. The controller raises OCC torque capacity, as indicated at 119, for securely holding OCC 24 while removing engine torque truncation, as indicated at 120.

Figure 7:
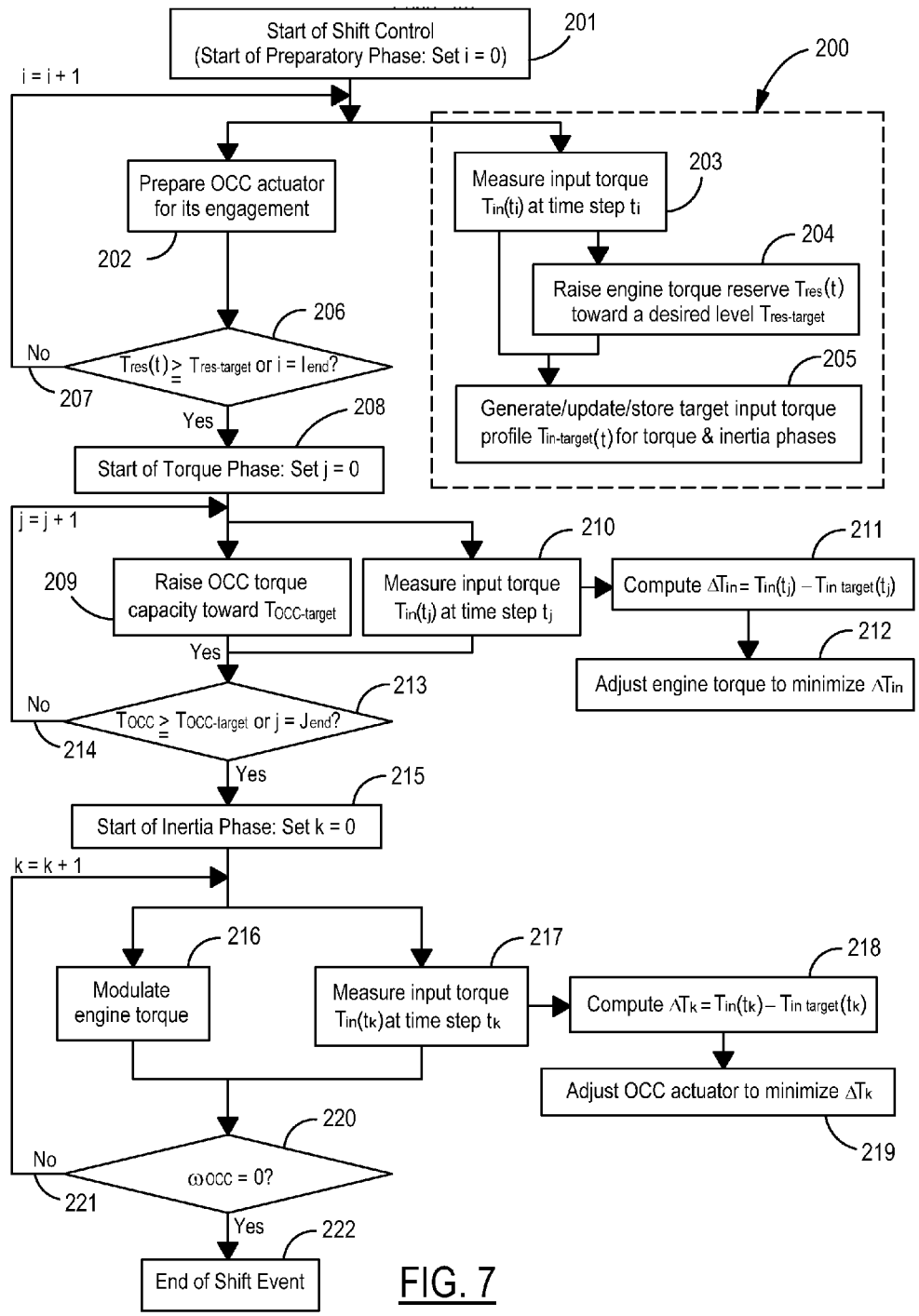
FIG. 7 illustrates a flowchart describing operation the control sequence operation of the up-shift control method in accordance with an embodiment of the present invention.

Referring now to FIG. 7, with continual reference to FIGS. 4, 5, and 6, a flowchart describing operation the control sequence operation of the up-shift control method in accordance with an embodiment of the present invention is shown.

The control sequence begins with the powertrain controller initiating a shift event and defining the start of the preparatory phase (i.e., setting i=0) as shown in block 201. The controller then prepares the actuator of OCC 24 for its engagement as shown in block 202. Input torque sensor 52 measures transmission input torque at every control time step i or at time $t_i$ and provides the corresponding input torque signal indicative of the measured transmission input torque to the controller as shown in block 203. The controller raises engine torque reserve $T_{res}$ toward a desired level $T_{res-target}$ while maintaining a steady transmission input torque level through a closed loop control based on measured input torque $T_{in}(t_i)$ as shown in block 204. The desired level $T_{res-target}$ is determined based on engine operating conditions. The controller generates a target input torque profile $T_{in-target}(t)$ for both the torque phase and the inertia phase based on available engine torque reserve $T_{res}(t_i)$ and input torque measurements $T_{in}(t_i)$ as shown in block 205.

As described, the controller generates the target input torque profile $T_{in-target}(t)$ for both the torque and inertia phases according to a control algorithm provided by blocks 203, 204, and 205. The control algorithm is indicated by block 200 which encompasses blocks 203, 204, and 205. This control algorithm will be described in greater detail below with reference to FIG. 8 which illustrates a flowchart describing the operation of the control algorithm.

The controller determines the end of the preparatory phase when $T_{res}(t_i)$ reaches $T_{res-target}$ or when i reaches a pre-calibrated time interval $I_{end}$ as shown in block 206. The controller iterates the control loop as shown at 207 until the conditions in block 206 are met. When the preparatory phase ends (i.e., when the conditions in block 206 are met), the control sequence moves to the start of the torque phase and the controller sets the control loop index j to 0 as shown in block 208. The controller raises OCC torque capacity toward a pre-determined target level $T_{OCC-target}$ for its engagement as shown in block 209. Input torque level $T_{in}(t_i)$ is measured by input torque sensor 52 at every control time step j or at time $t_j$ as shown in block 210. The controller computes the difference $\Delta T_{in}$ between the measured input torque $T_{in}(t_i)$ and the target input torque profile $T_{in-target}(t)$ as shown in block 211. Subsequently, the controller adjusts the engine torque level through spark timing control or other means such as the use of an auxiliary electric motor to minimize the error $\Delta T_{in}$ through a closed loop control as shown in block 212.

The controller determines the end of the torque phase when the OCC torque capacity $T_{OCC}$ assumes the pre-determined target level $T_{OCC-target}$ or when j reaches a pre-determined time interval $J_{end}$ as shown in block 213. The OCC torque capacity $T_{OCC}$ can be determined based on torque estimation algorithms. Alternatively, the torque phase ends when the load exerted on OWC 22 approaches zero.

The controller iterates the control loop beginning from block 213 as shown at 214 until the end-of-torque phase conditions in block 213 are met. When the torque phase ends (i.e., when the conditions in block 213 are met), the control sequence moves to the start of the inertia phase.

At the start of the inertia phase, the controller sets its time step index k to 0 as shown in block 215. The controller may modulate or truncate the engine torque during the inertia phase as shown in block 216 in order to complete OCC engagement within a targeted inertia phase duration. The controller continues to collect from input torque sensor 52 input torque measurements $T_{in}(t_k)$ at every control time step $t_k$ as shown in block 217. The controller computes the error $\Delta T_k$ between the measured input torque $T_{in}(t_k)$ and the target input torque profile $T_{in-target}(t_k)$ for the inertia phase as shown in block 218. The controller adjusts the actuator of OCC 24 to reduce the error $\Delta T_k$ in a closed loop manner as shown in block 219. Until OCC slip speed $\omega_{OCC}$ reaches zero as shown in block 220, the controller iterates the control loop as shown at 221. When the inertia phase ends, the controller removes engine torque modulation and raises OCC torque capacity for securely locking OCC 24 to complete the shift control sequence as shown in block 222.

Figure 8:
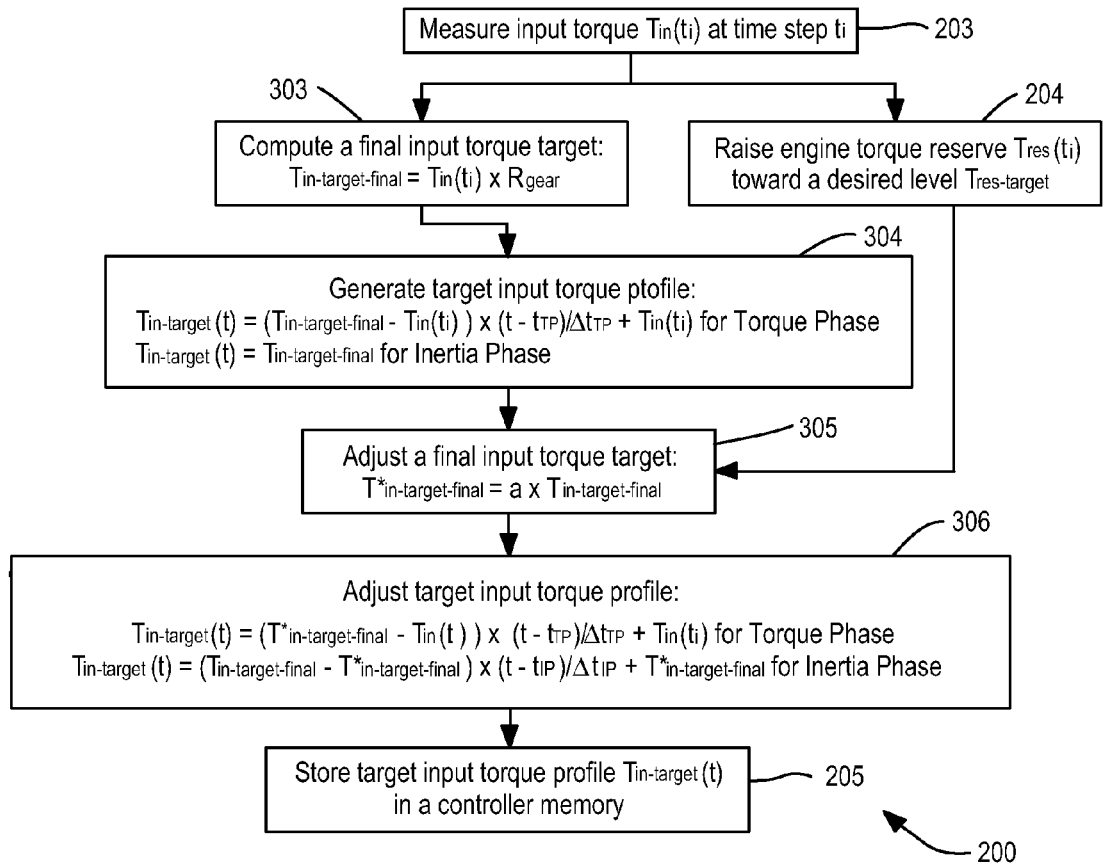
FIG. 8 illustrates a flowchart describing operation of a control algorithm of the up-shift control method in which the control algorithm is for generating a target transmission input shaft torque profile for each of the torque and inertia phases.

Referring now to FIG. 8, with continual reference to FIG. 7, a flowchart describing operation of a control algorithm of the up-shift control method in which the control algorithm is for generating a target transmission input shaft torque profile $T_{in-target}(t)$ for each of the torque and inertia phases is shown. As indicated above, the control algorithm is designated as block 200 in FIG. 7 and encompasses blocks 203, 204, and 205 of FIG. 7.

In operation, the controller samples a transmission input torque measurement from input torque sensor 52 at every control time step i or at time $t_i$ as shown in block 203. The controller raises engine torque reserve $T_{res}(t_i)$ toward a desired torque level $T_{res-target}$ while maintaining a steady transmission input torque level through a closed loop control based on the measured input torque $T_{in}(t_i)$ as shown in block 204. Specifically, the controller maintains the input torque $T_{in}(t_{i+1})$ within $T_{in}(t_i)+\Delta T_{in}(t_i)$, where $\Delta T_{in}$ is a pre-determined threshold parameter. The desired torque level $T_{res\text{-}target}$ is determined based on engine operating conditions.

As indicated by block 303, the controller generates a final input torque target $T_{in\text{-}target\text{-}final}$ by multiplying $T_{in}(t_i)$ by a pre-determined gear ratio $R_{gear}$, where $R_{gear}$ is associated with the gear ratio changing. The controller constructs the target input torque profile $T_{in\text{-}target}(t)$ for the torque phase by raising the torque level linearly from the current level $T_{in}(t_i)$ to the final target $T_{in\text{-}target\text{-}final}$ between $t_{TP}$ and $t_{IP}$ (or over the torque phase $\Delta t_{TP}$) as shown in block 304, where $t_{TP}$ and $t_{IP}$ are the beginning of the torque phase and the inertia phase, respectively. The controller maintains the target input torque profile $T_{in\text{-}target}(t)$ for the inertia phase at the final target $T_{in\text{-}target\text{-}final}$ during the inertia phase $\Delta t_{IP}$ as shown in block 304.

It is noted that the beginning of the torque phase $t_{TP}$ is dynamically adjusted at every control time step depending on when the preparatory phase ends. Further, the torque phase $\Delta t_{TP}$ and the inertia phase $\Delta t_{IP}$ may be determined based on desired target intervals.

The engine torque reserve $T_{res}(t_i)$ may not achieve its desired target $T_{res\text{-}target}(t_i)$ at the end of the preparatory phase. In this case, the controller re-calculates the final input torque target $T^*_{in\text{-}target\text{-}final}$ based on $T_{res}(t_i)$ as shown in block 305, where "a" is an adjustable parameter.

The controller re-constructs a target input torque profile $T_{in\text{-}target}(t)$ for the torque phase by increasing the torque level linearly from $T_{in}(t_i)$ to the final target $T^*_{in\text{-}target\text{-}final}$ as shown in block 306. The controller re-constructs a target input torque profile $T_{in\text{-}target}(t)$ for the inertia phase by increasing the torque level linearly from $T^*_{in\text{-}target\text{-}final}$ to $T_{in\text{-}target\text{-}final}$ over $\Delta t_{IP}$ as shown in block 306. The target input torque profile $T_{in\text{-}target}(t)$ is stored in a memory of the controller as shown in block 205 to enable input-torque based shift control according to the present invention.

Figure 9:
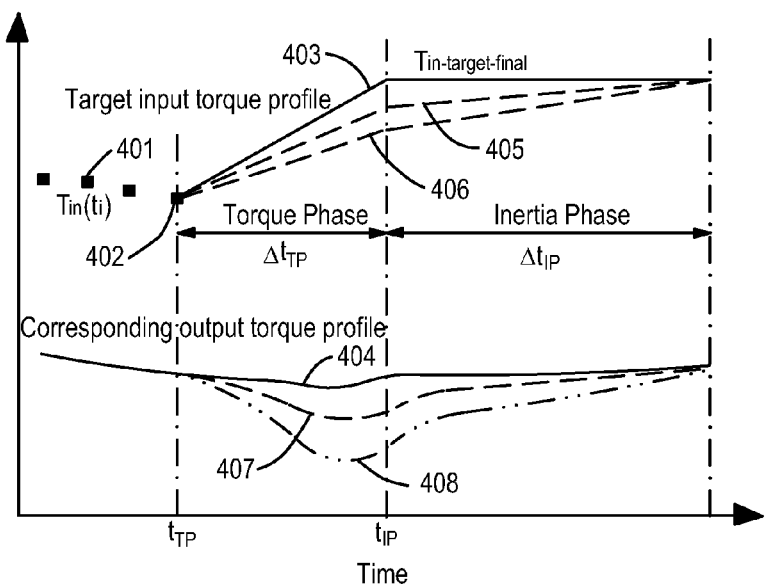
FIG. 9 illustrates a plot that demonstrates target input torque profiles and resulting output torque profiles according to the up-shift control method in accordance with an embodiment of the present invention.

Referring now to FIG. 9, a plot that demonstrates target input torque profiles and resulting output torque profiles according to the up-shift control method in accordance with an embodiment of the present invention is shown. During the preparatory phase, input torque is measured using input torque sensor 52 as indicated at 401. The last input torque measurement $T_{in}(t_{TP})$ during the preparatory phase is noted at 402. Based on $T_{in}(t_{TP})$, a target input torque profile is constructed for both the torque phase and the inertia phase without truncating $T_{in\text{-}target\text{-}final}$ as indicated at 403. When a controller follows this input target profile 403 using the control sequence of the up-shift control method in accordance with an embodiment of the present invention, the output torque profile 404 remains flat during the torque phase without a torque hole. Input torque profiles are lowered, indicated respectively at 405 and 406, when engine torque reserve is not fully available. This results in a corresponding partially filled torque hole, indicated respectively at 407 and 408.

Figure 10:
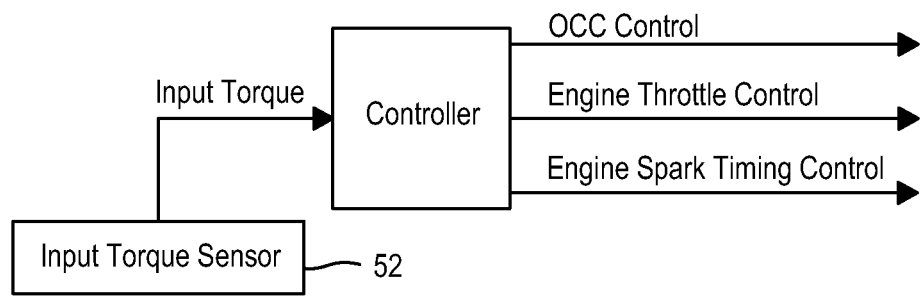
FIG. 10 illustrates a schematic diagram of a powertrain controller in accordance with embodiments of the present invention.

Referring now to FIG. 10, a schematic representation of the controller that would be used in a powertrain in accordance with embodiments of the present invention is shown. The controller includes memory that receives input signals including input torque sensor signals from input torque sensor 52. The controller includes a processor which uses the input signals in execution of appropriate algorithms including pressure command functions, speed functions, and torque functions herein described. The controller distributes appropriate signals to OCC 24 and distributes appropriate engine control signals as shown.

As described, embodiments of the present invention may have the following features and advantages. A unique process to control non-synchronous up-shift events for a vehicle powertrain system having a step-ratio automatic transmission system equipped with an input shaft torque sensing device and means to increase or supplement engine torque during shifting, including a step-ratio, pre-transmission hybrid electric vehicle. The use of transmission input torque measurements to select a desired input torque profile and to control transmission input torque to achieve the desired input torque profile in a closed loop manner during a non-synchronous up-shift event. A process to select a desired input torque profile for both torque and inertia phases based on measured input torque during the preparatory phase of up-shifting. A process to increase engine torque through a closed-loop control based on input torque measurements while maintaining a steady input torque level during the preparatory phase. A process to adjust a desired input torque profile for torque and inertia phases based on available engine torque reserve which is created during the preparatory phase of up-shifting. A process to control engine torque in a controlled manner based on error between measured transmission input torque and target input torque profile during the torque phase. A process to control OCC torque in a controlled manner based on error between measured transmission input torque and target input torque level during the inertia phase. A process to eliminate or reduce torque hole for eliminated or reduced shift shock and for increased driving comfort.

Engine torque control and OCC torque capacity are decoupled through the use of input torque measurements. As a result, the detrimental effects of OCC clutch control variability, such as inconsistent shift feel, are eliminated or reduced by maintaining transmission input torque at a desired level through a closed loop engine torque control based on measured input torque.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention. For example, engine torque reserve may be readily supplemented by an auxiliary electric motor.

What is claimed:

1. A method for a non-synchronous automatic transmission having gearing defining multiple torque flow paths from an input shaft to an output shaft and further having a one-way coupling and an on-coming clutch ("OCC") for shifting from a low gear configuration to a high gear configuration during a ratio up-shift event having a preparatory phase, a torque phase, and an inertia phase, the method comprising:

during the up-shift event, measuring input torque using an input torque sensor in communication with the input shaft;

determining a target input torque profile for the torque phase and a target input torque profile for the inertia phase each based on the input torque measured during the preparatory phase;

during the torque phase raising the torque capacity of the OCC and controlling an engine torque to cause the input torque to achieve the target input torque profile for the torque phase; and during the inertia phase, controlling the OCC to cause the input torque to achieve the target input torque profile for the inertia phase.

2. The method of claim 1 wherein:
the input torque sensor is a magneto-elastic torque sensor.

3. The method of claim 1 wherein:
controlling the engine torque to cause the input torque to achieve the target input torque profile for the torque phase includes using a closed loop control based on the input torque measured during the torque phase.

4. The method of claim 1 wherein:
controlling the OCC to cause the input torque to achieve the target input torque profile for the inertia phase includes using a closed loop control based on the input torque measured during the inertia phase.

5. The method of claim 1 wherein:
causing the input torque to achieve the target input torque profile for the torque phase includes controlling at least one of engine spark timing, turbo-charging, fuel injection, electronic valve timing, and an electric motor.

6. The method of claim 1 further comprising:
during the preparatory phase, stroking the OCC to prepare the OCC for engagement;
wherein raising the torque capacity of the OCC during the torque phase includes raising the torque capacity of the OCC towards a pre-identified OCC torque capacity level.

7. The method of claim 6 further comprising:
during the inertia phase, truncating the engine torque in order to complete engagement of the OCC within a targeted inertia phase duration.

8. The method of claim 1 further comprising:
during the preparatory phase, increasing an engine torque reserve to a pre-identified engine torque reserve level while preventing significant changes in the input torque during the preparatory phase.

9. The method of claim 8 wherein:
increasing the engine torque reserve to the pre-identified engine torque reserve level while preventing significant changes in the input torque during the preparatory phase includes using a closed-loop control based on the input torque measured during the preparatory phase.

10. The method of claim 8 wherein:
increasing the engine torque reserve to the pre-identified engine torque reserve level while preventing significant changes in the input torque during the preparatory phase includes at least one of controlling engine throttle, engine spark timing, turbo-charging, fuel injection, and electronic valve timing based on the input torque measured during the preparatory phase.

11. The method of claim 8 wherein:
the target input torque profiles for the torque and inertia phases are each based on the input torque measured during the preparatory phase and the engine torque reserve.

12. The method of claim 8 wherein:
the pre-determined engine torque reserve level is based on engine operating conditions.

13. A non-synchronous automatic transmission comprising:
an input shaft connectable to an engine via a torque converter;
an output shaft;
gearing defining multiple torque flow paths from the input shaft to the output shaft;
a one-way coupling and an on-coming clutch ("OCC") for shifting from a low gear configuration to a high gear configuration during a ratio up-shift event having a preparatory phase, a torque phase, and an inertia phase;
an input torque sensor in communication with the input shaft and configured to measure input torque during the up-shift event; and
a controller in communication with the OCC, the engine, and the input torque sensor, the controller configured to:
determine a target input torque profile for the torque phase and a target input torque profile for the inertia phase each based on the input torque measured during the preparatory phase;
during the torque phase, raise the torque capacity of the OCC and control an engine torque to cause the input torque to achieve the target input torque profile for the torque phase; and
during the inertia phase, control the OCC to cause the input torque to achieve the target input torque profile for the inertia phase.

14. The transmission of claim 13 wherein:
the input torque sensor is a magneto-elastic torque sensor.

15. The transmission of claim 13 wherein:
the controller is further configured to control the engine torque to cause the input torque to achieve the target input torque profile for the torque phase using a closed loop control based on the input torque measured during the torque phase;
the controller is further configured to control the OCC to cause the input torque to achieve the target input torque profile for the inertia phase includes using a closed loop control based on the input torque measured during the inertia phase.

16. The transmission of claim 13 wherein:
the controller is further configured to control at least one of engine spark timing, turbo-charging, fuel injection, electronic valve timing, and an electric motor to cause the input torque to achieve the target input torque profile for the torque phase.

17. The transmission of claim 13 wherein:
the controller is further configured to stroke the OCC to prepare the OCC for engagement during the preparatory phase;
the controller is further configured to raise the torque capacity of the OCC during the torque phase to a pre-identified OCC torque capacity level;
the controller is further configured to truncate the engine torque in order to complete engagement of the OCC within a targeted inertia phase duration during the inertia phase.

18. The transmission of claim 13 wherein:
the controller is further configured to increase an engine torque reserve to a pre-identified engine torque reserve level while preventing significant changes in the input torque during the preparatory phase;
wherein the target input torque profiles for the torque and inertia phases includes are each based on the input torque during the preparatory phase and the engine torque reserve.

19. A method comprising:
measuring input torque of an input shaft of a non-synchronous transmission having an on-coming clutch ("OCC") during an up shift having preparatory, torque, and inertia phases using a torque sensor at the input shaft;
generating an input torque target based on the measured input torque during the preparatory phase;
during the torque phase, raising torque capacity of the OCC and controlling engine torque to cause the input torque to achieve the target.

20. The method of claim 19 further comprising:
generating an input torque target for the inertia phase based on the input torque during the preparatory phase; and
during the inertia phase, controlling the OCC to cause the input torque to achieve the target for the inertia phase.

* * * * *